United States Patent [19]

Carlson et al.

[11] Patent Number: 5,123,507

[45] Date of Patent: Jun. 23, 1992

[54] CLUTCH DEVICE FOR A PRINTING PRESS

[75] Inventors: Herbert L. Carlson, Chicago; Jozef W. Niemiro, Darien, both of Ill.

[73] Assignee: Rockwell International Corporation, El Segundo, Calif.

[21] Appl. No.: 747,307

[22] Filed: Aug. 19, 1991

[51] Int. Cl.⁵ .............................. F16D 13/76
[52] U.S. Cl. ........................ 192/14; 192/19; 192/71; 101/247
[58] Field of Search ........ 192/14, 16, 19, 48.3, 192/71, 93 B; 101/218, 247

[56] References Cited

U.S. PATENT DOCUMENTS

| 35,405 | 5/1982 | Washburn | 192/14 |
|---|---|---|---|
| 40,046 | 9/1863 | Jones | 192/19 X |
| 127,192 | 5/1872 | Sellers | 192/16 |
| 324,690 | 8/1885 | Henkel | 192/16 |
| 923,559 | 6/1909 | Moser | 192/19 X |
| 1,619,892 | 3/1927 | Smith | 192/71 |
| 1,899,660 | 2/1933 | Becker | 192/19 |
| 2,071,405 | 2/1937 | Jahnel | 192/19 |
| 3,176,812 | 4/1965 | Towne | 192/71 |
| 3,744,760 | 7/1973 | Uher | 192/19 X |
| 4,309,945 | 1/1982 | Marion | 101/247 |

Primary Examiner—Leslie A. Braun
Assistant Examiner—Nicholas Whitelaw
Attorney, Agent, or Firm—C. B. Patti; V. L. Sewell; H. F. Hamann

[57] ABSTRACT

A cluth device (20) for a printing press (22) having a rotatably mounted elongated drive shaft (24), a device (26) for rotatably driving the shaft (24), a bearing member (30) rotatably mounted on the shaft (24), a pulley (32) rotatably mounted on the bearing member (30), and a clutch member (54) for selectively securing the pulley (32) to the drive shaft (24) in an operatng condition of the press (22) to drive said pulley (32), and for locking the pulley (32) to a stationary member (48) of the press (22) with the pulley (32) being maintained stationary with respect to said shaft (24) and bearing member (30).

12 Claims, 7 Drawing Sheets

CLUTCH DEVICE FOR A PRINTING PRESS

BACKGROUND OF THE INVENTION

The present invention relates to clutch devices for a printing press.

In the past, various auxiliary assemblies, such as a quarter folder in a printing press, have been driven by a drive device, such as a motor and its accompanying drive shaft, in order to selectively operate the auxiliary assemblies in one configuration of the press, and with the drive device being silenced in an idle condition of the press to cease temporary operation of the auxiliary assemblies. In a typical manner, the auxiliary assemblies have been driven by a drive pulley with an endless belt passing over the pulley and suitable pulleys in the auxiliary assemblies, with the drive pulley being rotatably mounted on a bearing assembly, and with the bearing assembly being rotatably mounted on the drive shaft. Although the drive assemblies including the drive pulley and belt may work satisfactorily in driving the auxiliary assemblies, in the event that the drive pulley is placed in an idle configuration by a clutch between the drive shaft and drive pulley to cease operation of the auxiliary assemblies, a bearing by the bearing assembly may fail, and the drive pulley may be inadvertently driven by the drive shaft in this case, thus causing undesired and unexpected operation of the auxiliary assembly which may cause harm or injury to an operator positioned closely to the auxiliary assembly.

SUMMARY OF THE INVENTION

A principal feature of the present invention is the provision of an improved clutch device for a printing press.

The clutch device of the present invention comprises, a rotatably mounted drive shaft, means for rotatably driving the shaft, and a bearing member rotatably mounted on the shaft. The device also has a pulley rotatably mounted on the bearing member.

A feature of the present invention is the provision of means for selectively securing the pulley to the drive shaft in an operating condition of the press.

Thus, a feature of the present invention is that the pulley is driven by the drive shaft in this configuration of the press.

Another feature of the invention is the provision of means for locking the pulley to a stationary member or frame in an idle condition of the press.

Yet another feature of the invention is that the drive shaft is disconnected from the pulley in this configuration of the press.

A further feature of the invention is that under this condition of the press the pulley is maintained stationary with respect to the shaft and bearing.

Another feature of the invention is that the pulley is locked to the frame in order to prevent inadvertent movement of the pulley in the event of failure of the bearing member.

Accordingly, a feature of the present invention is that the clutch device prevents inadvertent movement of an auxiliary device in the event of failure of the bearing member.

Yet another feature of the invention is that the clutch device thus prevents possible harm or injury to an operator who may be stationed near the auxiliary device.

Further features will become more fully apparent in the following description of the embodiments of this invention, and from the appended claims.

DESCRIPTION OF THE PREFERRED EMBODIMENTS

Figure 1:
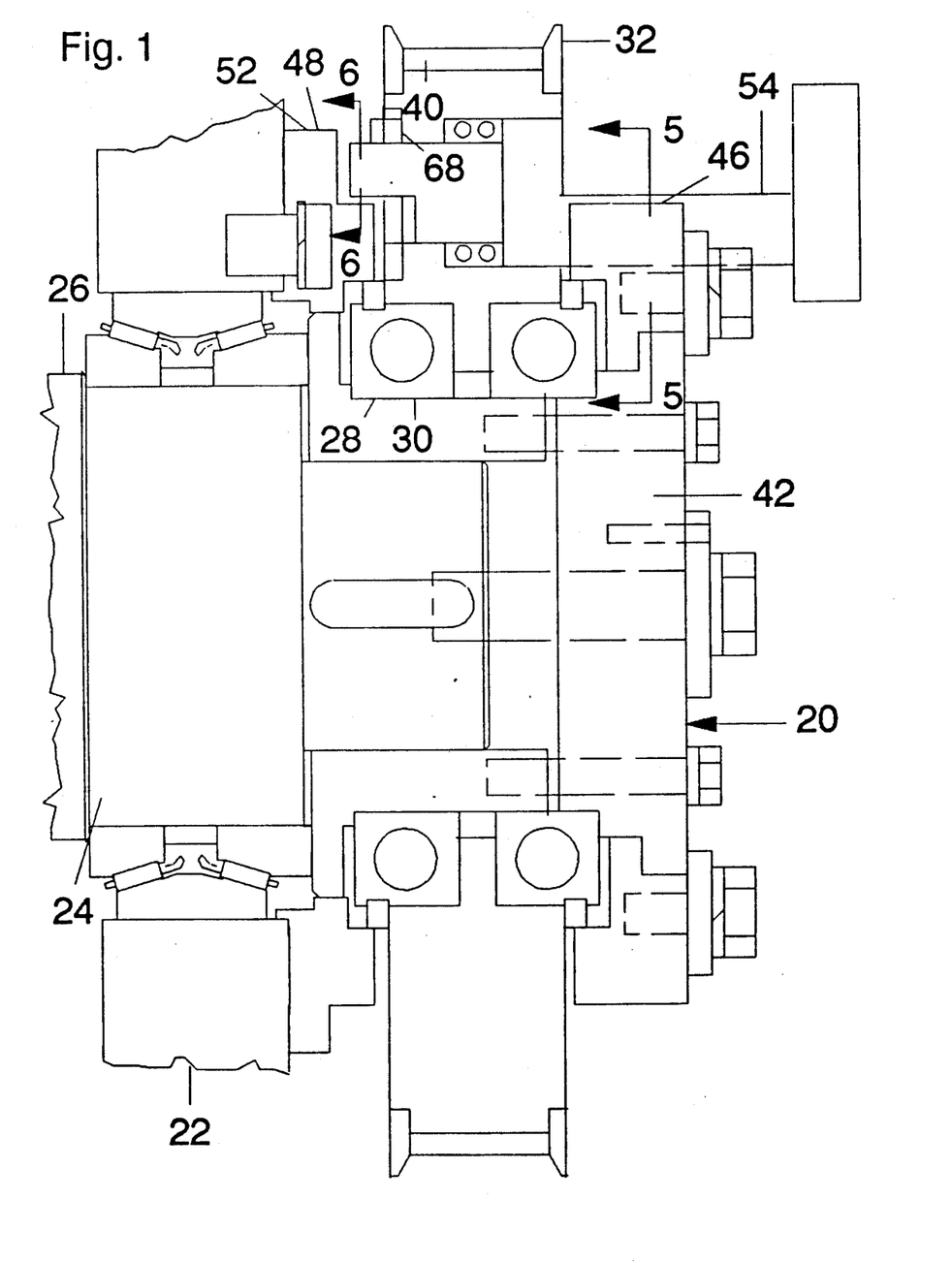
FIG. 1 is a fragmentary plan view of a clutch device for a printing press of the present invention.
Figure 2:
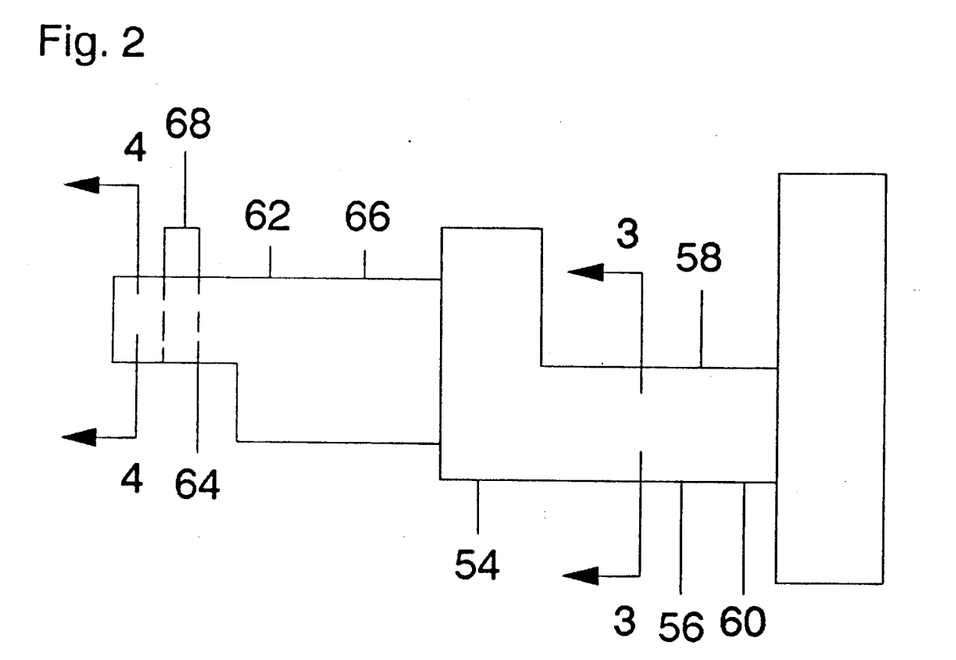
FIG. 2 is a plan view of a clutch member for the clutch device of FIG. 1.
Figure 3:
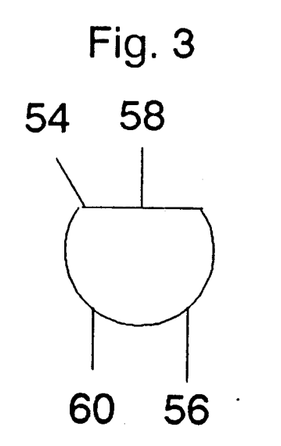
FIG. 3 is a sectional view taken substantially as indicated along the line 3—3 of FIG. 2.
Figure 4:
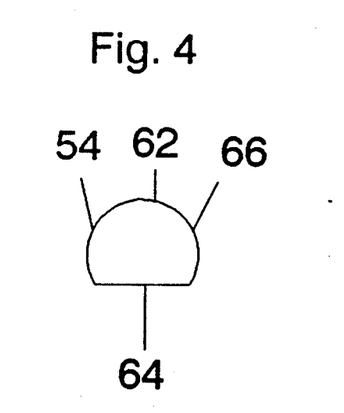
FIG. 4 is a sectional view taken substantially as indicated along the line 4—4 of FIG. 2.
Figure 5:
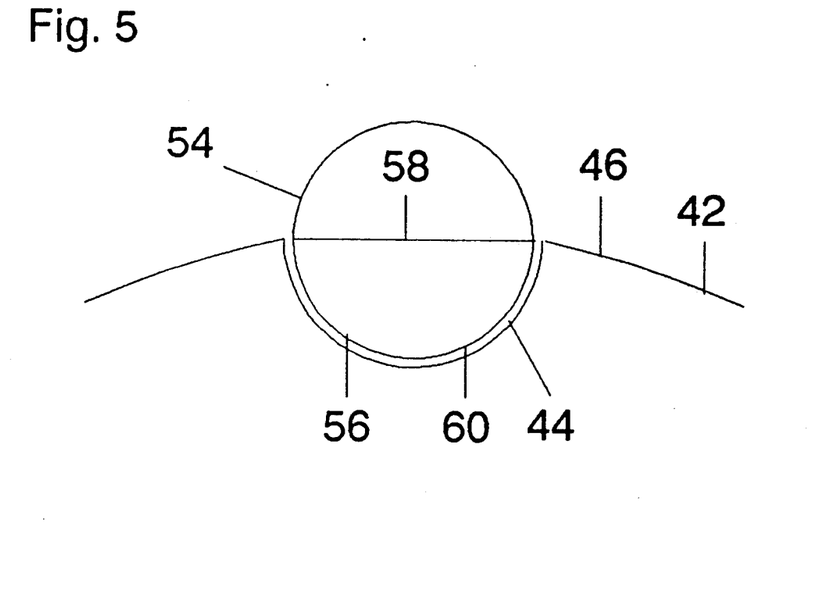
FIG. 5 is a sectional view taken substantially as indicated along the line 5—5 of FIG. 1.

Referring now to FIG. 1, there is shown a clutch device generally designated 20 for a printing press 22. The clutch device 20 has an elongated drive shaft 24 driven by a suitable motor 26, with the drive shaft 24 having a generally cylindrical surface 28 in one portion of the press 22.

Figure 7:
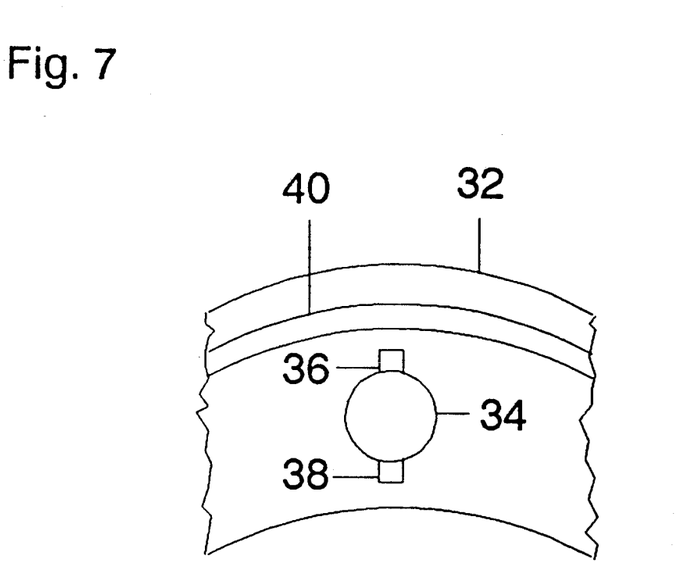
FIG. 7 is a fragmentary elevational view of a portion of a pulley for the clutch device of FIG. 1.

As shown, the clutch device 20 has an annular bearing member 30 rotatably mounted o the cylindrical surface 28 of the shaft 24, such that the bearing member 30 is free to rotate on the cylindrical surface 28 of the shaft 24. The device 20 also has an annular pulley 32 rotatably mounted on the bearing member 30, and being free to rotate on the bearing member 30 with respect to the shaft 24. As shown in FIG. 7, the pulley 32 has a generally circular opening 34, and a pair of opposed slots 36 and 38 extending from the opening 34, with the opening 34 and slots 36 and 38 extending through the pulley 32. The press 22 also has an endless drive belt 40 passing over the pulley 32 and also passing over suitable pulleys and drive members of an auxiliary piece of equipment of the press 22, such as a quarter folder.

Figure 6:
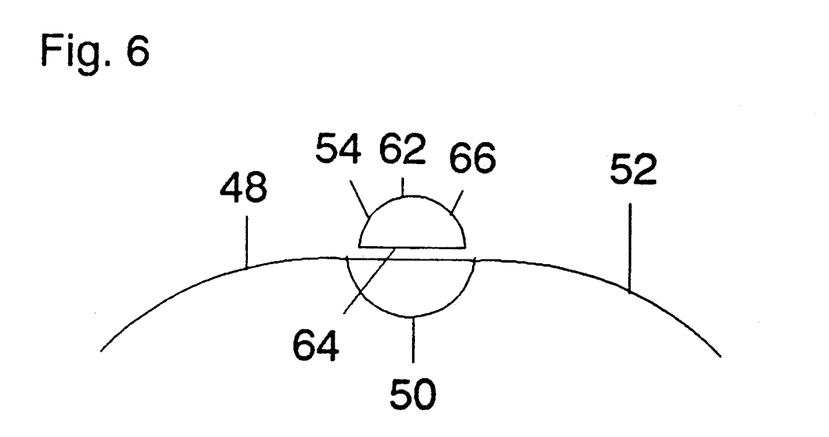
FIG. 6 is a fragmentary sectional view taken substantially as indicated along the line 6—6 of FIG. 1.

The clutch device 20 also has a drive member 42 secured to the drive shaft 24 adjacent one end of the drive shaft 24, and having a generally semi-cylindrical or hemi-cylindrical recess 44 adjacent an outer surface 46 of the drive member 42. The press 22 also has a stationary member or frame 48 of the press 12, which is located on an opposed side of the pulley 32 relative to the drive member 42. As shown in FIG. 6, the stationary member 48 has a semi-cylindrical or hemi-cylindrical recess 50 adjacent an outer surface 52 of the stationary member 48.

As shown in FIGS. 1–4, the clutch device 20 has a clutch member 54 rotatably mounted in the press 22 and extending through the opening 34 of the pulley 32. The clutch member 54 has a first semi-cylindrical or curved surface 56 joined with an opposed first generally planar surface 58 in a first inner portion 60 of the clutch member 54, and a second semi-cylindrical or hemi-cylindrical surface 62 joined to an opposed generally planar second surface 64 in a second outer portion 66 of the clutch member 54. As shown, the first planar surface 58 of the first portion 60 is generally aligned with the second planar surface 64 of the other portion 66, with the curved surfaces 56 and 62 facing in opposite directions. The clutch member 54 also has an outwardly directed pin 68 located adjacent the outer end of the second semi-cylindrical portions 62 of the clutch member 54.

Figure 11:
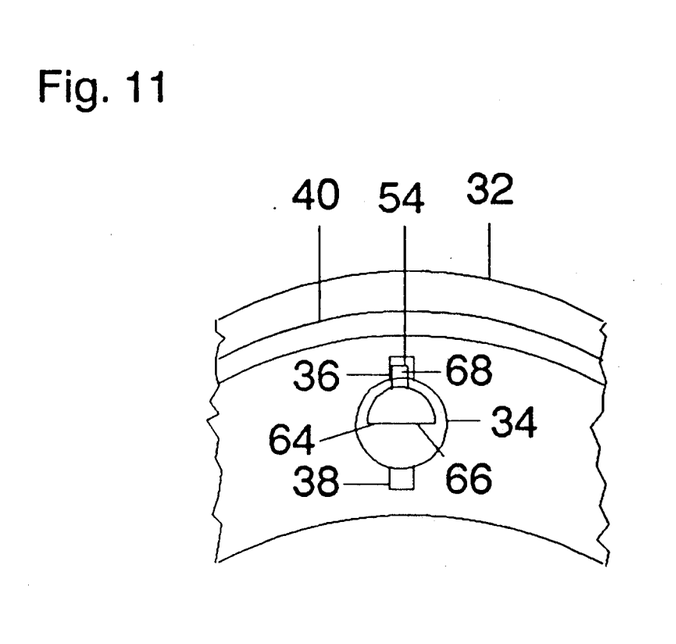
FIG. 11 is a fragmentary elevational view of the pulley showing the clutch member in a drive configuration of the press.
Figure 12:
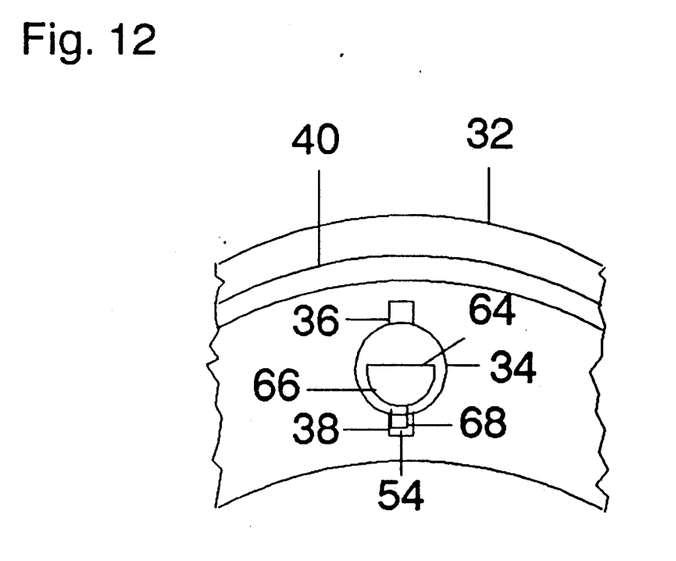
FIG. 12 is a fragmentary elevational view of the pulley illustrating the clutch member in an idle configuration of the press.

The clutch member 54 is movable between a first angular position, as shown in FIG. 1, with the first semi-cylindrical portion or surface 56 being received in the recess 44 of the drive member 42, and with the pin 68 of the clutch member 54 being received in the slot 36 of the pulley 32, as shown in FIG. 11. In this configuration, as shown in FIG. 6, the planar surface 64 of the second portion 66 of the clutch member 54 faces the recess 50 of the stationary member 48 and being spaced from the recess 50 of the stationary member 48. Thus, in this configuration, the drive member 42 is engaged with the pulley 32 through the clutch member 54, and the clutch member 54 is disengaged from the stationary member 48 such that the drive shaft 24 rotatably drives the pulley 32 through the clutch member 54.

Figure 8:
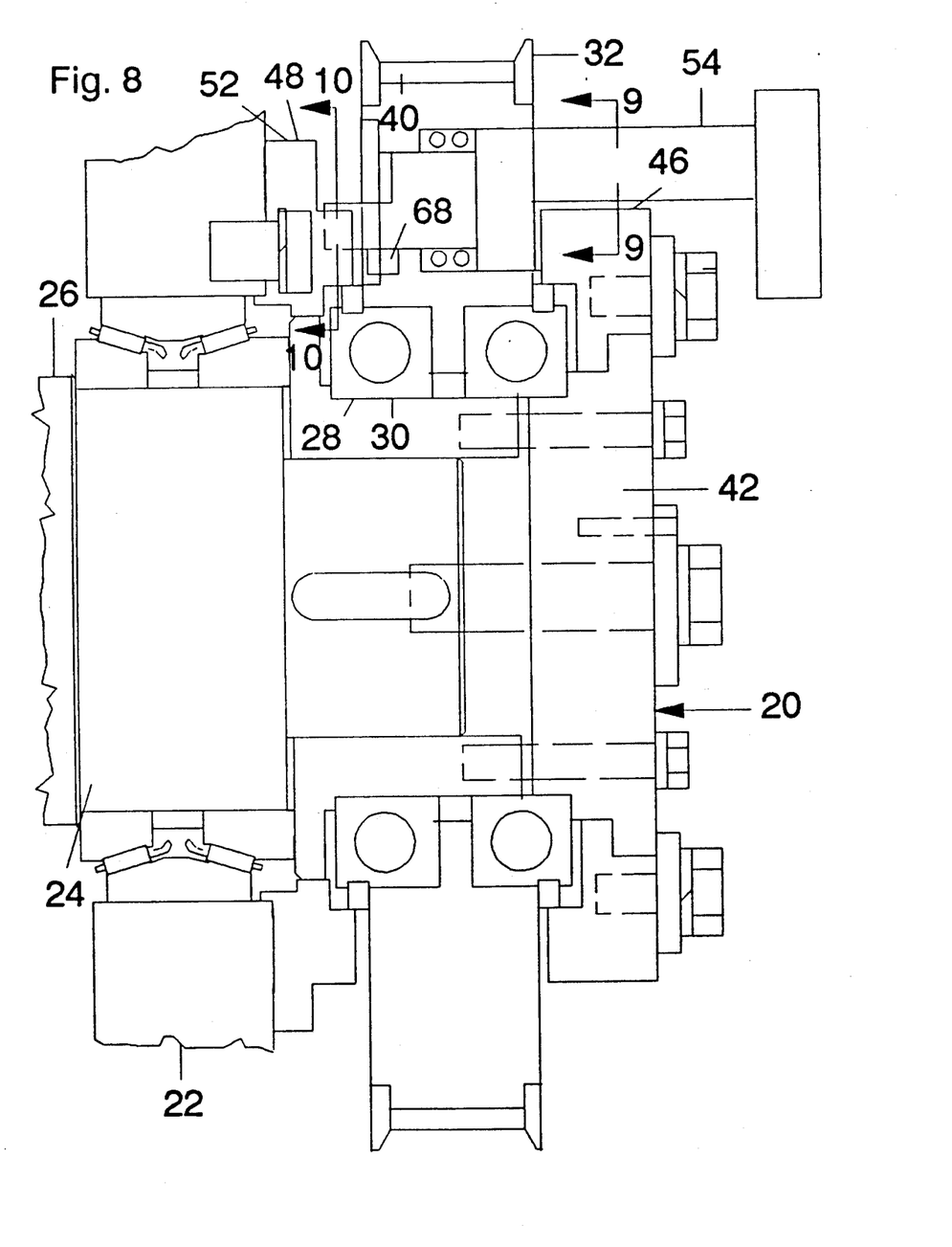
FIG. 8 is a fragmentary plan view of the clutch device of FIG. 1 with a clutch member of the clutch device in a locking configuration of the press.
Figure 9:
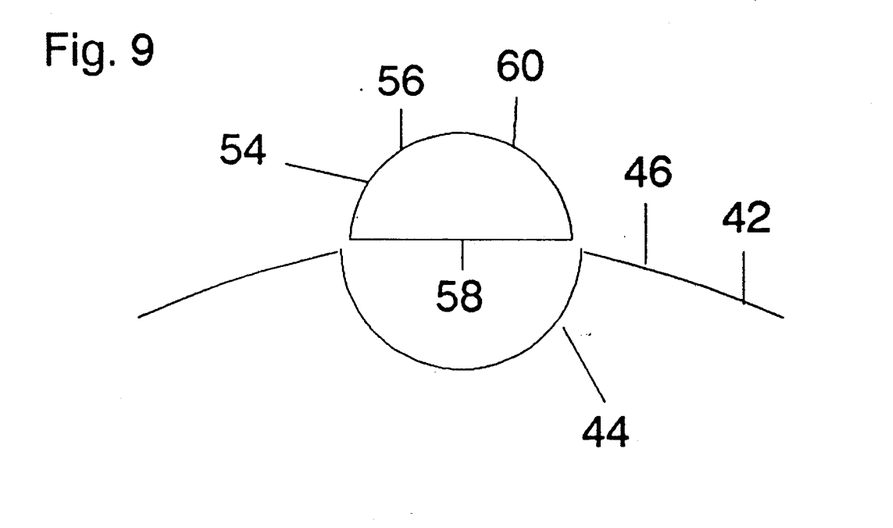
FIG. 9 is a fragmentary sectional view taken substantially as indicated along the line 9—9 of FIG. 8.
Figure 10:
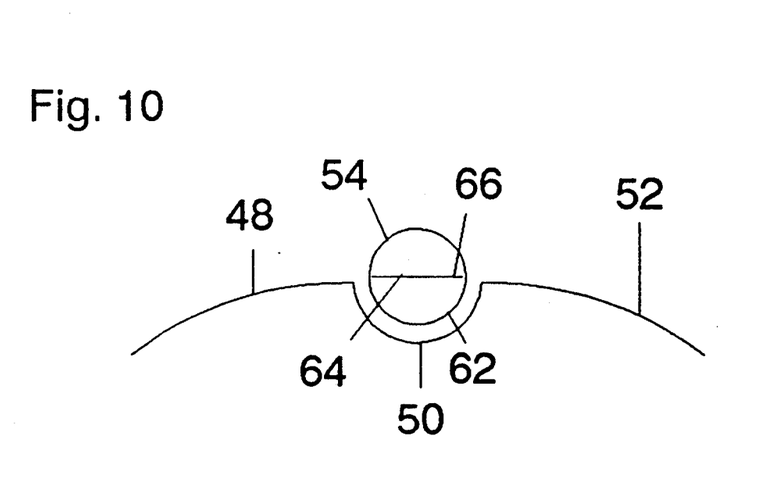
FIG. 10 is a fragmentary sectional view taken substantially as indicated along the line 10—10 of FIG. 8.

With reference to FIG. 8, the clutch member 54 may be withdrawn slightly, and rotated to a second angular position after which the clutch member 54 is returned to its original lateral position in the clutch device 20. In this configuration, the planar surface 58 of the first portion 60 faces the recess 44 of the drive member 42, and is spaced from the recess 44 of the drive member 42 in order to disengage the drive member 42 from the pulley 32. Thus, in this configuration of the press 22, the pulley 32 is placed in an idle or silenced configuration during which the pulley 32 is not driven by the drive shaft 24. In this configuration, the pin 68 of the clutch member 54 is received in the other slot 38 of the pulley 32, and the second semi-cylindrical portion 60 is received in the recess 50 of the stationary member or frame 48 in order to disengage the drive member 42 from the clutch member 54 and pulley 32, and engage the pulley 32 with the stationary member 48. In this configuration, the clutch member 54 locks the pulley 32 to the frame 48 of the press 22 in order to prevent rotation of the pulley 32 relative to the shaft 24, and thus prevent movement of the belt 40 and operation of the auxiliary equipment, such as the quarter folder. Thus, in this configuration, the pulley 32 is locked to the frame 48 in order to ensure that the pulley 32 is not moved by a failure of the bearing member 30, in order to ensure that the auxiliary equipment is not operated which otherwise might harm an individual positioned close to the auxiliary equipment, and not expecting the equipment to move.

Thus, in accordance with the present invention, the clutch member 54 is moved from a first rotational position in which the drive member 42 and drive shaft 24 are engaged with the pulley 32 in order to drive the pulley 32, belt 40, and the auxiliary equipment. In this configuration, the clutch member 54 is disengaged from the frame 48. The clutch member 54 may be moved to a second rotational position in which the pulley 32 is disengaged from the drive shaft 24 in an idle configuration of the press 22, and while the pulley 32 is locked to the frame or stationary member 48 in order to prevent inadvertent movement of the pulley 32 and belt 40, thus ensuring that the auxiliary equipment does not inadvertently operate in this configuration.

The foregoing detailed description has been given for clearness of understanding only, and no unnecessary limitations should be understood therefrom, as modifications will be obvious to those skilled in the art.

What is claimed is:

1. A clutch device for a printing press, comprising:
   a rotatably mounted drive shaft;
   means for rotatably driving the shaft;
   a bearing member rotatably mounted on the shaft;
   a pulley rotatably mounted on the bearing member; and
   means for selectively securing the pulley to the drive shaft in an operating condition of the press to drive said pulley, and for locking the pulley to a stationary member in an idle condition of the press with the pulley being maintained stationary with respect to said shaft and bearing, said securing and locking means comprising a clutch member being engageable with the pulley and drive shaft in a first angular position of the clutch member, and being engageable with the pulley and stationary member in a second angular position of the clutch member.

2. The device of claim 1 wherein the drive shaft has a generally cylindrical outer surface, in which the bearing member has an annular configuration, and in which the bearing member is rotatably mounted on the cylindrical surface of the drive shaft.

3. The device of claim 1 wherein the bearing member has an annular configuration, in which the pulley has an annular shape, and in which the pulley is rotatably mounted on the bearing member.

4. The device of claim 1 wherein the pulley has a pair of spaced slots, in which the clutch member has an outwardly directed pin, and in which said pin is received in one of the slots in said first angular position of the clutch member, and is received in the other slot in a second angular position of the clutch member.

5. The device of claim 1 including a drive member secured to the drive shaft, wherein the clutch member is engaged with the drive member in a first angular position of the clutch member, and is disengaged from the drive member in a second angular position of the clutch member.

6. The device of claim 5 wherein the drive member has a generally semi-cylindrical recess in an outer surface of the drive member, in which the clutch member has a generally semi-cylindrical portion adjacent said recess having a curved surface on one side of the semi-cylindrical portion joined by a generally flat surface on the other side of the semi-cylindrical portion, in which the curved surface is received in said recess in the first angular position of the clutch member such that said drive member is engaged with the clutch member in said first angular position, and in which the flat surface of the semi-cylindrical portion faces the recess and being spaced from the recess to disengage the drive member from the clutch member in the second angular position of the clutch member.

7. The device of claim 6 in which the semi-cylindrical portion is located adjacent an inner end of the clutch member.

8. The device of claim 1 wherein the stationary member comprises a frame for the press.

9. The device of claim 1 including a drive belt passing over said pulley.

10. A clutch device for a printing press, comprising:
an elongated drive shaft having a generally cylindrical surface in one portion of the press;
means for rotatably mounting the drive shaft in the press;
means for rotatably driving the shaft;
an annular bearing member rotatably mounted on the cylindrical surface of the shaft;
an annular pulley rotatably mounted on the bearing member and having an opening and a pair of opposed slots extending from the opening;
an endless drive belt passing over said pulley;
a drive member secured to the drive shaft adjacent the pulley, with the drive member having a generally semi-cylindrical recess adjacent an outer surface of the drive member;
a stationary member located on an opposed side of the pulley relative to the drive member, said stationary member having a semi-cylindrical recess adjacent an outer surface of the stationary member; and
a clutch member rotatably mounted in the press and extending through the opening of the pulley, said clutch member having a first semi-cylindrical surface joined with an opposed first generally planar surface in a first inner portion of the clutch member, a second semi-cylindrical surface joined to an opposed generally planar second surface in a second outer portion of the clutch member, with the planar surfaces of the first and second portions being generally aligned, with the semi-cylindrical surfaces of the first and second portions facing in opposite directions, and with the clutch member having an outwardly directed pin intermediate the first and second portions of the clutch member, said clutch member being movable between a first angular position with the first semi-cylindrical portion being received in the recess of the drive member, the pin of the clutch member being received in one of the slots of the pulley, and the planar surface of the second portion of the clutch member facing and being spaced from the recess of the stationary member, such that the drive member is engaged to the pulley by the clutch member and the clutch member is disengaged from the stationary member to rotatably drive the pulley, and a second angular position with the planar surface of the first portion of the clutch member facing and being spaced from the recess of the drive member to disengage the drive member from the pulley, with the pin of the clutch member being received in the other of said pulley slots, and with the second semi-cylindrical portion of the clutch member being received in the recess of the stationary member to disengage the drive member from the clutch member and pulley and engage the pulley to the stationary member to prevent rotation of the pulley and movement of the belt.

11. A clutch device for a printing press, comprising:
a rotatably mounted drive shaft;
means for rotatably driving the shaft;
a bearing member rotatably mounted on the shaft;
a pulley rotatably mounted on the bearing member; and
means for selectively securing the pulley to the drive shaft in an operating condition of the press to drive said pulley, and for locking the pulley to a stationary member in an idle condition of the press with the pulley being maintained stationary with respect to said shaft and bearing, said securing and locking means comprising a clutch member being engageable with the pulley and drive shaft in a first angular position of the clutch member, and being engageable with the pulley and stationary member in a second angular position of the clutch member, wherein the stationary member has an outer semi-cylindrical recess, in which the clutch member has a generally semi-cylindrical portion adjacent said recess having a curved surface on one side of the semi-cylindrical portion joined by a generally flat surface on the other side of the semi-cylindrical portion, in which the flat surface is positioned adjacent and is spaced from said recess in the first angular position of the clutch member to disengage the clutch member from the stationary member, and in which the curved surface is received in said recess in the second angular position of the clutch member to lock the clutch member to the stationary member.

12. The device of claim 11 wherein the semi-cylindrical portion is adjacent an outer end of the clutch member.

* * * * *